United States Patent [19]
Birmingham et al.

[11] Patent Number: 4,954,320
[45] Date of Patent: Sep. 4, 1990

[54] REACTIVE BED PLASMA AIR PURIFICATION

[75] Inventors: Joseph G. Birmingham, Joppa; Robert R. Moore, Fallston, both of Md.

[73] Assignee: The United States of America as represented by the Secretary of the Army, Washington, D.C.

[21] Appl. No.: 401,199

[22] Filed: Aug. 31, 1989

Related U.S. Application Data

[63] Continuation-in-part of Ser. No. 184,848, Apr. 22, 1988, abandoned.

[51] Int. Cl.$^5$ .............................................. B01J 19/08
[52] U.S. Cl. ............................... 422/186.04; 422/184; 422/186; 422/186.3; 55/131; 55/101; 55/75; 423/210
[58] Field of Search ............ 422/186, 186.07, 186.13, 422/186.04; 55/75, 101, 135; 423/210

[56] References Cited

U.S. PATENT DOCUMENTS 4,086,152  4/1978  Rich et al. ........................ 204/176
4,095,115  6/1978  Orr, Jr. et al. .................. 422/186.07

FOREIGN PATENT DOCUMENTS

215105  12/1981  Japan .................................. 422/186

Primary Examiner—Stephen J. Lechert, Jr.
Assistant Examiner—Nina Bhat
Attorney, Agent, or Firm—Anthony T. Lane; Edward Goldberg; Michael C. Sachs

[57] ABSTRACT

The Reactive Bed Plasma is a novel air purification and material processing device which may efficiently treat both toxic chemicals and hazardous aerosols. The Reactive Bed Plasma device embodies an active alternating current discharge plasma permeating a dielectric packed bed. Advantages of this device include an increased power efficiency by the elimination of dielectric barriers (characteristic of ozonizer devices); a selectively increased residence time of contaminants in the active plasma zones through interaction with the packing material (analogous to chromotographic separations); also a reduced size and power consumption while maintaining high processing efficiency. Further advantages include greatly increased operating lifetime without failure due to electrical arcing (problematic with ozonizers) or poisoning of the packing surfaces (problematic with adsorbents and catalysts); an achievement of a high processing efficiency at low temperature; a control over plasma air by-product formation; and the promotion of chemical and physical reactions simultaneously in a single device heretofore requiring several vastly different devices (promoting photoionoization, catalytic oxidation, plasma-induced decomposition, combustion, electrostatic precipitation, or plasma etching processes).

13 Claims, 6 Drawing Sheets

REACTIVE BED PLASMA AIR PURIFICATION

GOVERNMENTAL INTEREST

The invention described herin may be made, used or licensed by or for the Government for governmental purposes without the payment to us of any royalties thereon.

CONTINUING DATA

This application is a continuation-in-part of application Ser. No. 184,848 now abandoned, filed Apr. 22, 1988, which entire application and file wrapper thereof is hereby incorporated by reference herein, as thought fully set forth at length.

BACKGROUND AND FIELD OF THE INVENTION

The removal of toxic vapors from flowing air streams has relied upon adsorption, absorption, photoionization, catalysis, or incineration. To date, charcoal adsorption has been the proven technology for ambient temperature purification of contaminated air streams, while incineration has been the proven technology for high temperature purification of contaminated air streams. However, charcoal filters suffer from a short lifetime, limited adsorptive capacity for toxic compounds, desorption of toxic compounds from the filter, and selectivity for only certain classes of compounds. Additionally, a charcoal filter must be used in conjunction with a particulate filter to collect toxic aerosols. Particulate filters also have a limited lifetime resulting from clogging which restricts air flow. Catalytic technology applicable to broad chemicl processing such as air purification requires high temperatures to achieve efficient decomposition and is subject to poisoning. Many devices such as incinerators, infrated reactors, catalytic reactors, and thermal equilibrium plasma devices especially direct current arcs, rely on thermal energy to induce chemical reactions. All of the exposed surfaces and the air stream must be raised to a high equilibruim temperature by the transfer of thermal energy. Chemical reactions are promoted when sufficient thermal energy forces the atoms and molecules to 'collide'.

J. M. Henis (U.S. Pat. No. 3,983,021) discloses a packed electrical discharge device for decomposing nitrogenous oxides ($NO_x$) in a gas stream composed predominantly of nitrogen. The chemical conversion efficiency of the process is low. This device would not be useful as a plasma air purification system because as the oxygen concentration is increased to levels found in breathable air, the plasma-formed by-products such as $O_3$ increase to toxic levels in the reactor effluent. R. McNabney (U.S. Pat. No. 3,734,846) utilizes a fluidized bed silent electrical discharge for the conversion of oxygen to ozone. Similarly, Heinemann (U.S. Pat. No. 4,774,062) improves the power efficiency of a conventional ozonizer by reducing the thickness of the dielectric barriers on the electrodes. It should be mentioned that the gas phase decomposition does not occur rapidly with ozone as the oxidant. Therefore, any ozone generating corona discharge will not efficiently decompose toxic material. These devices suffer low chemical conversion efficientcies because of their low activity plasmas. Their requirement for dielectric barriers at the electrodes of these devices severely limits the power density of the plasmas generated. In addition, these low activity plasmas generate high concentrations of toxic by-products (especially ozone) when used to process air.

Several devices will resistively heat a catalytic mass (J. Koetschet, U.S. Pat. No. 1,400,959), or dielectrically heat with high frequency (Van Der Lande, U.S. Pat. No. 2,163,898) but these systems eventually poison and lose their functionality. Some authors have used photoactivation of catalysts (Mitscherling, U.S. Pat. No. 2,003,303) to accomplish chemical processing. Catalytic technology applicable to broad chemical processing applications requires high temperatures to achieve efficient decomposition. It should be noted that the usable lives of systems using conventional adsorbent and catalyst technologies are severly limited by saturation or poisoning. An important distinction between adsorbent-based or catalyst-based air purification systems and plasma systems is that air processed in adsorbent or catalyst systems does not yield the characteristic plasma air by-products such as nitrogenous oxides and ozone.

BRIEF SUMMARY OF THE INVENTION

The above-mentioned and other problems are solved by the Reactive Bed Plasma (RBP) device which comprises an alternating current plasma device with a porous spherical, granular, or fibrous material packed into the plasma zone. When the electrodes are conductors (and therefore non-dielectric) and the plasma cavity is made to contain a dielectric packing, it is possible to drive the plasma to a higher energy state than possible with devices comprising the current art. The active plasma has sufficient electron energy and density to insure the efficient decomposition of toxic vapors, gases and aerosols as well as ozone (a characteristic air by-product of lower energy plasmas). The ability to drive a plasma maintained above atmospheric pressure into energy levels above what is usually considered practical in the field is an objective of this invention. The elimination of the tubular dielectric barriers while generating a highly active plasma throughout a dielectric packed bed is a focus of this invention.

The presence of the porous packing enhances the performance of the device by further reducing air by-product formation, maximizing processing efficiency, reducing power consumption, and increasing volume flow rate (i.e. reducing carrier gas residence time). Porous packing materials are believed to work better for decontaminating the air than non-porous materials because they have more surface area, and thus slow the procession of the contaminant molecules through the active plasma zones relative to the bulk gas flow rate. One criterion for the selection of the porous packing material required to produce an energetic plasma is that the dielectric constant be greater than 1 (air=1). It seems it is not necessary for the constituents of the packing to closely touch each other, or to touch the electrodes closely. The addition of such packing, according to conventional thinking, was thought to quench the plasma formation; yet we have found that quite the contrary has been demonstrated to be true. The presence of the packing as the dielectric makes it possible to drive the sustained plasma to extremely high operating power levels, without catastrophic arcing. This discovery has helped to pave the way towards achieving the above-described air purification device, to be explained in further detail below.

The power supply needed to drive the energetic plasma must sustain electric field strengths such as 30 kilovolts/centimeter at frequency ranges such as 0.5 kilohertz to 40 kilohertz. The use of a solid state fast-tuning power supply optimizes the performance of the Reactive Bed Plasma system via constant frequency tuning and impedance matching. The source should be capable of at least manual frequency adjustment to insure that a minimum reflected power has been achieved. Inpedance matching of the power supply to the plasma system is critical to establishing the maximum power range of the plasma system within which frequency tuning minimizes losses in reflected power. Initially, the frequency and power levels need to be adjusted over a short time period as the device heats up, but the plasma tends to reach a steady state requiring little adjustment.

One major advantage of the proposed plasma system for air purification over other known systems is the relatively cool operating temperature, in one version approximately 100° C. while operating at atmospheric pressure. In contrast, one rotating arc plasma system which is known and which is said to decompose air contaminants, nevertheless uses incinerator level temperatures (i.e. 2,000°–10,000° C.). The power levels consumed are some 1000 kW (while our Reactive Bed Plasma device generally operates around 10 kilowatts). The electrodes needed to convert this much power to heat must be replaced sometimes in just a few hours because of failures. With such high heat and power requirements, it does not seem practical for field use when compared to the Reactive Bed Plasma device. While it is true that extremely high temperature levels cause the contaminant and other molecules to collide with great force, hence to decompose, they also tend to recombine later to form other toxic compounds (such as dioxin). Whereas with the Reactive Bed Plasma device, the reaction products are highly oxidized (such as water and carbon dioxide) and the thermal energy is believed too low to drive recombination reactions capable of producing products such as dioxin.

A Reactive Bed Plasma device produces an active plasma which yields energetic free electrons and highly reactive chemical species especially oxygen atoms to promote rapid oxidative decomposition of the contaminants in the air stream. This oxidation is similar to the process of incineration with the most notable difference being the dramatically reduced operating temperatures of the Reactive Bed Plasma device. Electron impact is the driving force of plasma-induced decomposition because it creates more free electrons, ions, reactive neutrals and radicals. Another result of direct energy input at the quantum level is the emission of ultraviolet light from nitrogen molecules. This ultraviolet radiation is capable of breaking some chemical bonds, ionizing many compounds, and disinfection of biological contaminants upon prolonged exposure.

Electrostatic, chemical and physical activation results from the plasma interactions at the surfaces of the packing material. The decomposing contaminants are attracted to the packing which effects an extended residence time in the Reactive Bed Plasma system. The plasma-activated surfaces promote characteristic reactions which aid in producing safer by-products. In addition, plasma species interact with the surfaces to purge any condensate or reaction products such as inorganic salts or oxides. The continual cleaning of the surfaces by the plasma prevents saturation or poisoning of the packing.

The combination of several decomposition mechanisms into a single device is a tremendous advance in the state-of-the-art.

DETAILED DESCRIPTION OF THE INVENTION

The Reactive Bed Plasma device can solve many of the problems associated with the use of other air purification systems. For example, this plasma device has air purification applications because of the ability to decompose most organic and inorganic toxic compounds, to control the reaction chemistry by altering the operating conditions of the reactor such as flow rate and applied power, to achieve long-term operation by the selection of suitable reactor components, to process aerosols (via electrostatic precipitation, interception, and other aerosol removal mechanisms as well as decomposition or deactivation of particulates such as aerosolized biological materials), to control plasma air by-product formation, and to attain an infinite capacity for toxic compounds by efficient decomposition and self-cleaning.

Figure 1:
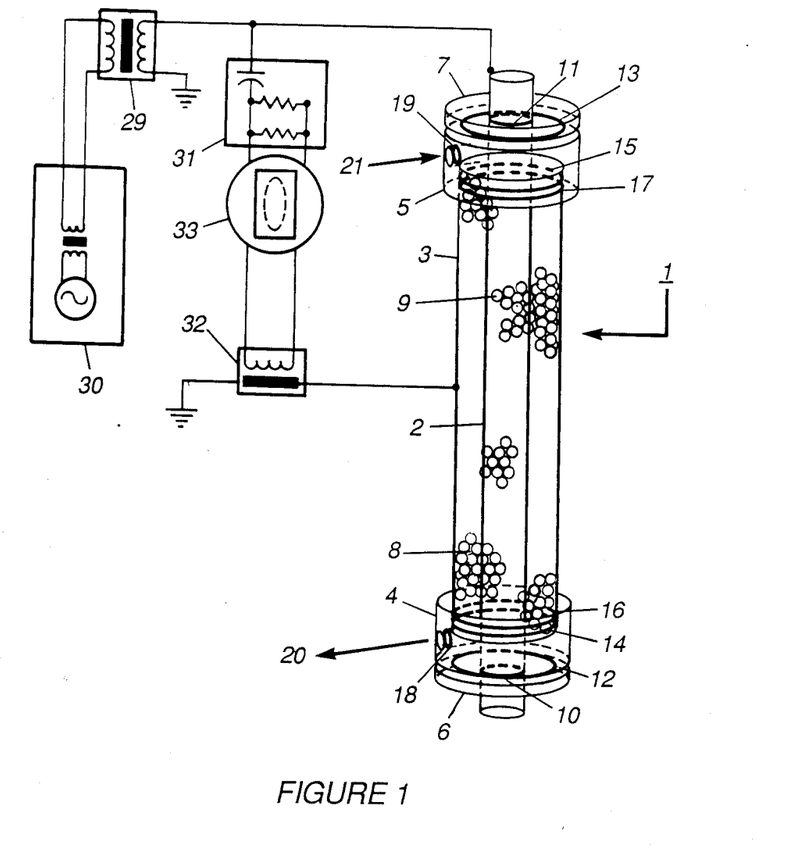
FIG. 1 illustrates the Reactive Bed Plasma device and the system required for operation, monitoring, and control.

The plasma air purification system is composed of several distinct components as illustrated in FIG. 1. The principal component is the device 1 and its associated power supply 30 and high voltage transformer 29 system. The measurement of power applied and deposited into the reactor is accomplished by use of voltage 31 and current 32 probe signals displayed simultaneously on an oscilloscope 33. The descriptions of the various components of the plasma air purification system and their operating characteristics are discussed in detail below.

Figure 2:
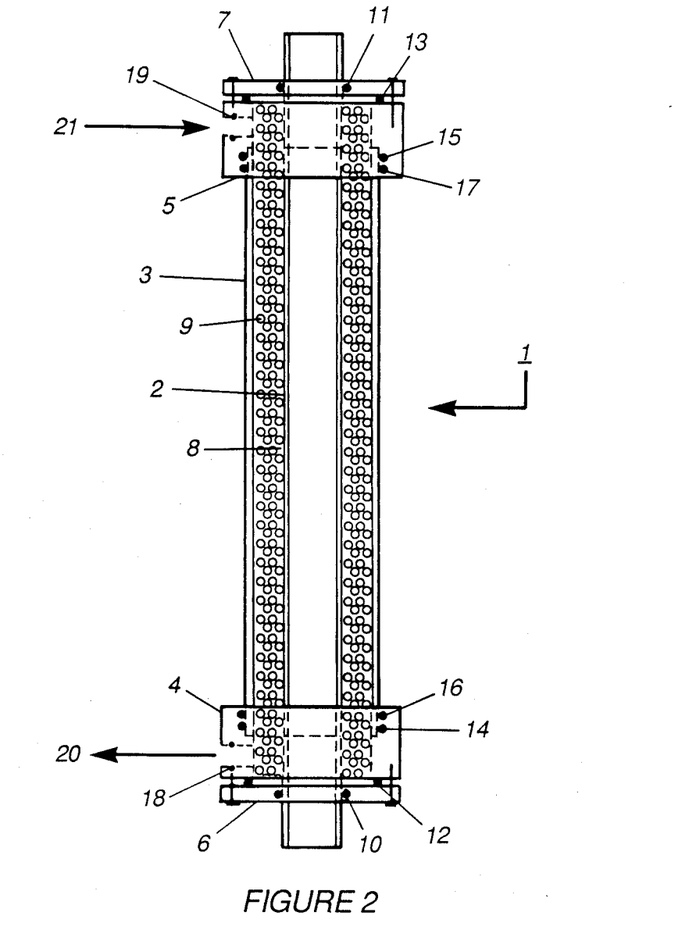
FIGS. 2 through 6 show axial cross-sectional views of various Reactive Bed Plasma devices useful in this system.
Figure 3:
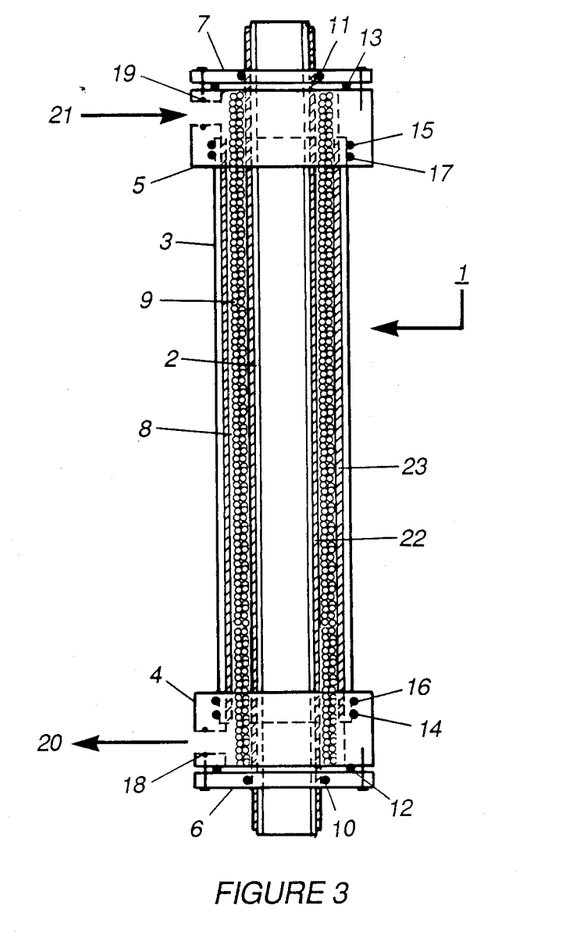
Figure 4:
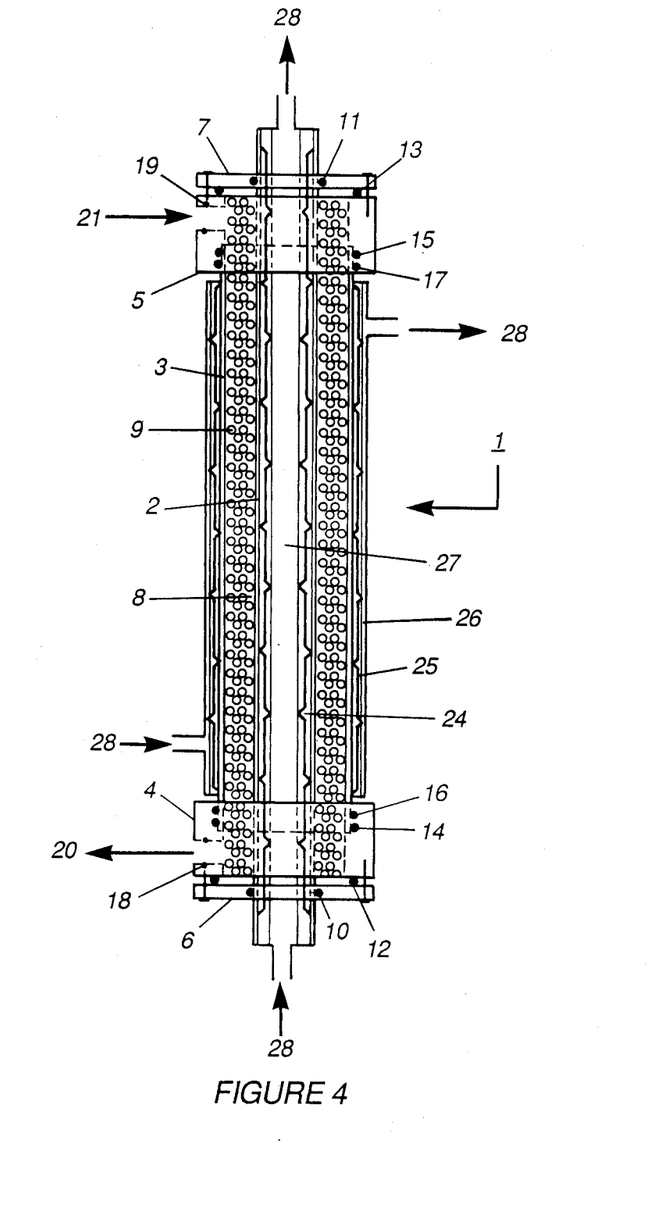

An embodiment of the plasma device 1 (FIG. 2) used for the above-mentioned toxic compound decomposition comprises an arrangement of concentric tubes comprising the first electrode 2 (smooth steel, aluminum, or other conductive materials including ionic solutions) and the second electrode 3 (steel, aluminum, or other conductive materials). The tubes 2, 3 are coaxially positioned by the insulating end-pieces 4, 5, 6, 7. The monolithic, nonconductive end-pieces 4, 5, 6, 7 are composed of two pieces such that O-ring seals 10, 11, 12, 13, 14, 15, 16, 17, 18, 19 maintain leakproof operation. The device 1 can be operated without or with chemically protective barriers 22, 23 to isolate the electrodes 2, 3 from the contaminated gas stream. One unique feature of the Reactive Bed Plasma device 1 is the elimination of the need established by pervious art for dielectric barriers to suppress arching in an electrical discharge plasma device. However, for many air purification and chemical processing applications, it is desirable to incorporate the protective barriers 22, 23 (FIG. 3) to preclude chemical reactions at the surfaces of the electrodes 2, 3. The chemically protective barrier materials include but are not limited to metals, polymers, glasses, and ceramics. The barrier material should be as thin as possible to minimize resistive losses. Cooling methods can be incorporated utilizing cooling jackets 26, 27 with countercurrent coolant flow 28 to maximize heat transfer as well as utilizing phase change processes such as heat pipes 24, 25 (FIG. 4). It is important to note that the proper selection of materials for the protective barriers 22, 23 and endpieces 4 through 7 precludes the need for cooling electrodes 2, 3.

Figure 5:
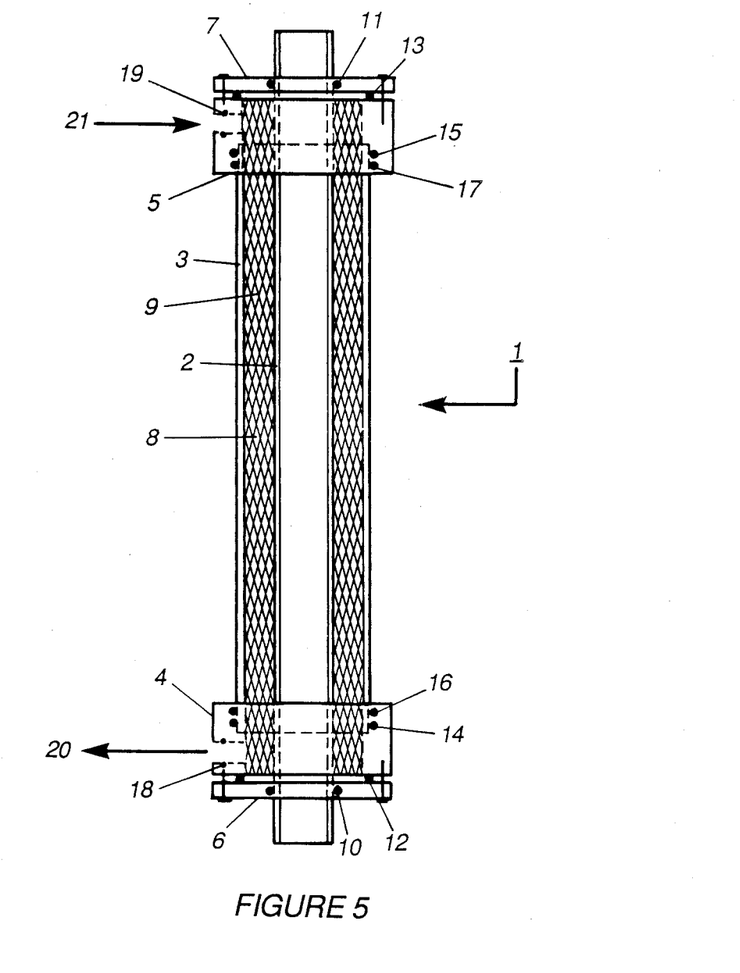
Figure 6:
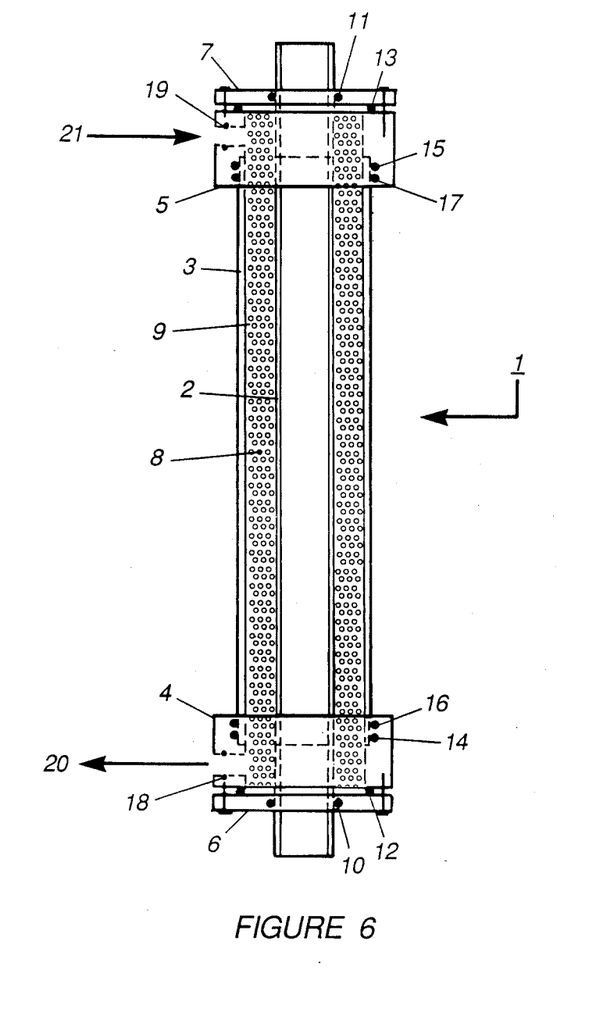

The packing 9 is placed in the annular volume 8 of the plasma device 1. The form of the packing material can be granular, tubular, ring, spheroidal or spherical (FIG. 2), fibrous (FIG. 5), or aggregate (FIG. 6). The packing should be composed of a material with a resistivity greater than the same volume of air and a dielectric constant of greater than one (which is the value for air). The packing surface may be inert or catalytic in nature. Surfaces impregnated with active metal catalysts have been demonstrated to be as effective as inert or unimpregnated packings. Pyrex beads, pyrex Raschig rings, platinum-palladium-rhodium catalyst spheroids, alumina spheroids, and other materials have been successfully utilized as packings. The packing material can be porous or nonporous, however, greater adsorptive capability is preferred for packings used in high performance reactors. The concept of altering residence time is critical to understanding one of the principal mechanisms of reactor operation. Characteristic of gas chromatography, a contaminant is introduced into a carrier gas at elevated temperature and passed through a packed column of granular material. The contaminant interacts with the packing sufficiently to slow its procession through the packed column relative to the carrier gas. Thus, while both carrier gas and contaminant molecules continuously enter and exit the packed column, the individual molecules of the contaminant require more time to traverse the packed column than the carrier gas molecules. In the Reactive Bed Plasma device 1, this chromatographic affect permits higher carrier gas flow rates to be attained while maintaining a very high processing efficiency for the contaminant which resides in the plasma for a longer period time. This relative time difference in plasma treatment increases the processing time of the contaminant resulting in higher efficiency and decreases the processing time of the air resulting in lower air by-products distribution. A critical aspect of plasma activation in particular is the characteristic of surface cleaning. Plasma species interact with the surfaces to purge any condensate or reaction products such as inorganic salts or oxides. The continual cleaning of the surfaces by the plasma prevents saturation or poisoning of the packing. This cleaning process insures optimum performance of the Reactive Bed Plasma device 1.

The power required to generate a plasma in the packed annular space 8 between the concentric cylinders 2, 3 of the device 1 is accomplished by coupling a variable frequency power supply 30 to a high voltage transformer 29. The applied and deposited powers are ascertained by simultaneously displaying secondary voltage probe 31 signals and secondary current probe 32 signals on an oscilloscope 33 permitting measurement of phase angles. The frequency of the system is tuned so that the voltage and current signals coherently interfere, producing values for the cosine of the phase angle which are close to one. This is also known as tuning to the resonant frequency of the plasma system. The significance of the phase angle is that the applied power to the device 1 is calculated by P=I*V* cos (phase angle). The phase angle can vary from plus or minus forth-five degrees and still maintain adequate plasma processing. The area of the Lissajous figure formed by the display of the current and voltage signals indicates deposited power. Additionally, the power system maximizes the power transferred to the device 1 with the inclusion of an impedance matching network to minimize the reflected power. Every component of the power system is designed to insure that the power applied and inputted to the device 1 is maximized. The packing 9 in the device 1 augments the power transfer into the annular space 8 by decreasing the electrical resistance between the electrodes 2, 3 while maximizing the strength of localized electric fields.

The power system operating parameters of the device include frequency, voltage, and current. The operational frequency range centers on the resonant frequency and can cover a range such as from 0.5 kilohertz to 40 kilohertz. The operational voltage ranges are large such as 4 kilovolts to 28 kilovolts and above. The electric field produced in the device must be in excess of 30 kilovolts per centimeter at atmostpheric pressure. The operational current ranges are large such as 1 milliampere to 0.2 ampere. The current and voltage applied to the Reactive Bed Plasma device 1 must be sufficient to destroy ozone. The electric power deposited into the device 1 is an important operating characteristic that describes the effectiveness of the plasma to decompose toxic materials. This device utilizes well developed techniques for measuring power in a corona device.

The Reactive Bed Plasma device 1 is driven by a high voltage RF alternating current in the kilohertz frequency range without dielectric barriers at the electrodes. Fundamentally, the applied power can be transferred into four different modes. The power can be consumed by dielectric breakdown, dielectric heating, resistive heating, or as radiation losses (or radiofrequency noise). Dielectric breakdown is the process in which the gas starts to conduct electricity while dielectric heating rasies the temperature of a typically solid material unable to resonant with the applied field without losses. Typically, RF frequencies in the megahertz range are used for heating dielectric materials due to favorable dissipation factors. (Conversely, kilohertz dielectric heating would not be an effective method to heat the porous materials mentioned previously). In devices utilizing high voltages at Kilohertz frequencies or lower, dielectric barriers at the electrodes are typically used to prevent catastrophic arcing. However, the undesirable result of dielectric barriers dissipating energy by resistive heating is eliminated in the Reactive Bed Plasma device 1 design. In addition, the radiative losses have been shown to be minimal and effectively minimized with shielding the reactor and power systems. Therefore, the Reactive Bed Plasma device 1 efficiently utilizes the applied power to maximize the dielectric breakdown.

The contaminant-bearing gas can be predominantly oxygen, nitrogen, air, argon, or helium at pressures ranging from below 20 torr to above 80 psia. Each gas requires different electric field strengths in order to dielectrically breakdown and form the ionized plasma state. However, the main objective of this system is to efficiently decompose toxic materials. Therefore, a most favorable performance of the system is for operation in air. The contaminant-bearing air or gas enters the device 1 through the gas inlet 21, flows through the plasma zone comprised of the packing 9 in the annular volume 8, and exits through the gas outlet 20. The plasma is typically initiated at atmospheric pressure or above. The plasma formed within the annulus 8 and throughout the packing material spanning the length of the electrodes 2, 3 is a highly ionized gas in which energy is deposited into the atoms and molecules by interaction with energetic electrons (i.e. electron impact).

A Reactive Bed Plasma device 1 produces an active plasma which yields energetic free electrons and highly reactive chemical species especially oxygen atoms to promote rapid oxidative decomposition of the contaminants in the air stream. This oxidation is similar to the process of incineration with the most notable difference being the dramatically reduced operating temperatures of the Reactive Bed Plasma device 1. The free electrons produced within the device 1 interact directly at a subatomic or chemical bond level. Thus, chemical reactions can be promoted without the excessive temperatures required for thermal excitation of the atoms and molecules. Another result of direct energy input at the quantum level is the emission of ultraviolet light from nitrogen molecules. This ultraviolet radiation is capable of breaking some chemical bonds, ionizing many compounds, and disinfection of biological contaminants upon prolonged exposure.

Electron impact is the driving force of plasma-induced decomposition because it creates more free electrons, ions, reactive neutrals and radicals. The contaminant molecules are decomposed via several possible mechanisms including electron impact dissociation or ionization, photodissociation or ionization, secondary ionization, ion-molecule reaction, radical surface reactions, and neutral species reactions. These electron-generated species are generally highly reactive and cause further rearrangement of the contaminant molecules passing through the plasma device 1. The modelling of fundamental processes of plasma device 1 indicate the importance of free oxygen radicals for efficient decomposition of toxic molecules as well as the significance of the air by-products distribution in assessing the performance of the plasma device. Further, the air by-products distribution observed experimentally has been predicted by a chemical reaction model for the system.

The surface reactions that are important to decomposition involve many mechanisms. The active plasma permeates a packed bed comporised of porous spherical, spheroidal, granular, tubular, ring, fibrous, or aggregate materials, which are surface-activated by the plasma processes. Electrostatic, chemical and physical activation results from the plasma interactions at the surfaces of the packing material. Several beneficial affects are manifest. The decomposing contaminants are attracted to the packing which effects an extended residence time in the Reactive Bed Plasma device 1. The active surfaces promote characteristic reactions which aid in producing safer by-products. The placement of the packing within the plasma enviroment of ultraviolet light, plasma-induced reactive species and other decomposition mechanisms allow a synergism to uniquely exist due to the plasma permeating the porous dielectric packed bed.

The purpose of utilizing a plasma reactor for air purification is to produce a breathable effluent from contaminated air. It was recognized that any plasma device capable of sustaining an air plasma at atmospheric pressure could produce nitric oxide (NO), nitrogen dioxide ($NO_2$), nitrogen pentoxide ($N_2O_5$), ozone ($O_3$), and carbon monoxide (CO). (The presence of air by-products in the effluent of the Reactive Bed Plasma indicates that plasma-unique chemical processes are occurring). The choice of operating conditions such as humidity, flow rate, and applied power affects the distribution of these by-products of air processing. However, the operating conditions that facilitate and control of air by-products must also result in the efficient decomposition of toxic materials. The operating conditions that produce substantial amounts of $O_3$ and sub-ppm concentrations of $NO_x$ and CO do not result in the efficient decomposition of toxic materials. For efficient chemical decompostion, a Reactive Bed Plasma device 1 must have applied power (at minimal voltage and currents) to produce an active plasma with sufficient electron energy and density to assure the in-situ decomposition of ozone. It was found that increased residence time of the air in the plasma zone resulted in the decomposition of $O_3$ and increased the formation of $NO_x$. The dry air by-product distribution that contains high concentrations of $NO_x$, sub-ppm levels of CO, and sub-ppm levels of $O_3$ is an air by-product distribution indicative of high chemical decomposition capability. The humidification of the air stream prior to discharge reduces $NO_x$ to lower ppm levels. Fortunately, typical power levels for operation of this device are too low to produce the high thermal temperatures responsible for reduction of $CO_2$ to CO. In fact, CO introduced at the influent of the device 1 or formed during hydrocarbon decomposition within device 1 is efficiently converted to carbon dioxide with sufficient residence time in the active plasma zone. Thus, the regulation of humidity, flow rate (i.e. residence time in the active plasma zone), and applied power dramatically reduce the air by-products concentrrations.

The consummate intrest of utilizing a plasma device 1 for air purification is the decomposition of toxic molecules in a flowing air stream. The plasma device 1 was evaluated for the decomposition and conversion efficiencies of toxic gases and vapors. Cyanogen chloride and phosgene were among the gases tested as air stream contaminants. The relative retention time of cyanogen chloride was found to be greatly increased by the packing material 9. The decomposition efficiency of the cyanide gas was greater than 99.6% with an air flow rate of 2.6 standard cubic feet per minute (scfm). At this flow rate, the air residence was 0.44 second while the residence time of the cyanogen chloride molecules was experimentally determined to be 7.3 seconds. The decomposition efficiency of phosgene was greater than 99.84% with an air flow rate of 5.5 scfm corresponding to an air residence time of 0.31 second. The reactor effluent monitoring revealed that parent toxic molecules were reduced to below hazardous concentrations. In the course of phosgene decomposition, chlorine gas was formed. This reaction product was readily removed by gas phase reaction with ammonia. Other commercial methods available for the removal of acid gas reaction products such as chlorine include fixed bed adsorbers and liquid scrubbers. Implementation of these specfic post-treatment methods results in the production of breathable air. In contrast, benzene was efficiently decomposed to carbon dioxide and water. Thus, no post-treatment was necessary to produce a breathable effluent. Therefore, the decomposition of aliphatic and aromatic compounds exhibits the universal chemical decomposition capability of the Reactive Bed Plasma device.

To operate independently as air filters in contaminated environments, these devices must remove hazaradous biological aerosols as well as chemical vapors. The Reactive Bed Plasma device 1 demonstrated the ability to deactivate Bacillus Globigi (BG) spores and decompose T-2 mycotoxin in a contaminated air stream. The deactivation of Bacillus Globigi spores was found to be greater than 99.9999% efficient. The decomposition efficiency of T-2 mycotoxin in a Reactive Bed Plasma device 1 was found to be greater than 99.72%. It should be mentioned that some aerosol sizes progressed through the Reactive Bed Plasma device 1 but these contained no BG or T-2 qualities. The collection efficiencies found for the Reactive Bed Plasma were very high but could be increased to ultrafiltration levels with the incorporation of a ceramic High Efficiency Particulate Air (HEPA) in the areas of the most intense electric fields. The most significant result is that the Reactive Bed Plasma device 1 provides protection against hazardous biological aerosols.

Contributions of this invention include the ability to efficiently process contaminated air streams at scfm flow rates, at atmospheric and higher pressures, at low and high relative humidities, and with efficient power usage. A significant advantage of the Reactive Bed Plasma device 1 is the ability to decompose with very high efficiencies the myriad of highly toxic materials which through accidental or deliberate release pose a serious environmental and health threat by contaminating air, water and soil.

While the invention may have been described with reference to one particular embodiment or embodiments, our invention also includes all substitutions and modifications within the spirit or scope of the invention, as will occur to those skilled in this art.

We claim:

1. A packed, alternating current electtrical discharge plasma device to decompose toxic contaminants in air for the purposes of air purification and general toxic and hazardous materials processing, including removal of ozone, carbon momoxide, and nitrogenous oxides from air, comprising;
   (a) a first electrode facing a second electrode;
   (b) a nonconducting packing material in a bed residing between said first and second electrodes;
   (c) an alternating current power supply to include but not limited to a frequency range of 0.5 kilohertz to 40 kilohertz frequency;
   (d) said power supply being connected to a transformer to produce high voltage alternating current to include but not limited to a voltage range of 4 kilovolts to 28 kilovolts;
   (e) said transformer being connected between said first and second electrodes to produce an air plasma throughout a packed bed;
   (f) said power supply, said transformer, said electrodes, and said packing comprisign a complex impedance wherein impedance matching is provided;
   (g) said powder supply, said transformer, said electrodes, and said packing comprising a resonant electrical circuit wherein frequency tuning is provided; and
   (h) said plasma with a power density necessary to achieve high decomposition efficiencies of toxic contaminants at both trace and percent concentrations, and flow capacities of 10 CFM or greater.

2. A device as claimed in claim 1 wherein said first and second electrodes comprise electrically-conductive, metal or nonmetal, rode, tubes, pipe, foils and films.

3. A device as claimed in claim 1 wherein said packing placed between said electrodes is a monolithic aggregate.

4. A device as claimed in claim 1 wherein said packing placed between said electrodes is a High Efficiency Particulate Air filter comprising ceramic, glass, or other suitable materials in the form of a fiber matrix.

5. A device as claimed in claim 1 wherein said reactor comprising means for operation with chemically protective coatings on said first and second electrodes comprising metallic, polymeric, glass, or ceramic coatings on said electrodes.

6. A device as claimed in claim 1 wherein said electrodes are cylindrically shaped and coaxial.

7. A device as claimed in claim 1 which provides a means for operation with cooling of said first and second electrodes wherein said first and second electrodes are heat pipes.

8. A device for removing contaminants from an air stream, comprising:
   means for creating a region of relatively high activity plasma; and
   means for passing the said air stream through said region, wherein contaminants are removed from said air stream through contact with said relatively high activity plasma.

9. The device of claim 8 wherein said means for creating further comprises:
   means for generating a plasma, including at least two electrically conducting electrodes, with the space between electrodes containing nonconducting, dielectric material.

10. The device of claim 9 wherein said electrodes are driven by a high-frequency, high-voltage, alternating current power source.

11. The device of claim 9 wherein said dielectric material comprises a material selected from the group which includes: glass, ceramic, pyrex, platinum-palladium- rhodium spheriod material, and alumina spheroid material.

12. The device of claim 9 wherein said dieletric material comprises porous dielectric beads packed in the space between the electrodes.

13. A device as in claim 1, wherein the typical operation of the reactor at atmospheric pressure or above, has the features of:
   (a) a combination of several mechanisms for decomposition including plasma-induced decomposition, combustion, photoionization, catalytic oxidation, electtrostatic precipitation, and plasma etching processes simultaneously and synergistically operating within said device;
   (b) efficient precipitation of aerosols, including biological spores, which are simultaneously deactivated in the plasma;
   (c) surface cleaning said packing occurring at atmospheric pressure; and
   (d) that residence time of contaminants in the active plasma zones is increased, due to the presence of the porous packing.

* * * * *

UNITED STATES PATENT AND TRADEMARK OFFICE
CERTIFICATE OF CORRECTION

PATENT NO. : 4,954,320

DATED : September 4, 1990

INVENTOR(S) : Birmingham, et al.

It is certified that error appears in the above-identified patent and that said Letters Patent is hereby corrected as shown below:

In column 1, line 14, "thought" has been changed to -- though --.

In column 3, line 8, "Inpedance" has been changed to -- Impedance --.

In column 4, line 57, "pervious" has been changed to -- previous --. In line 58, "arching" has been changed to -- arcing --.

In column 5, line 38, "period time" has been changed to -- period of time --.

In column 9, line 38, "momoxide" has been changed to -- monoxide --. In line 55, "comprisign" has been changed to -- comprising --. In line 58, "powder" has been changed to -- power --.

In column 10, line 54, "electtrostatic" has been changed to -- electrostatic --.

Signed and Sealed this

Fourteenth Day of January, 1992

Attest:

HARRY F. MANBECK, JR.

*Attesting Officer*  *Commissioner of Patents and Trademarks*